Dec. 17, 1968          F. H. McCLERNON          3,416,855
                  DEVICE FOR MEASURING THE CORNEA
Filed Aug. 17, 1964                            3 Sheets-Sheet 2
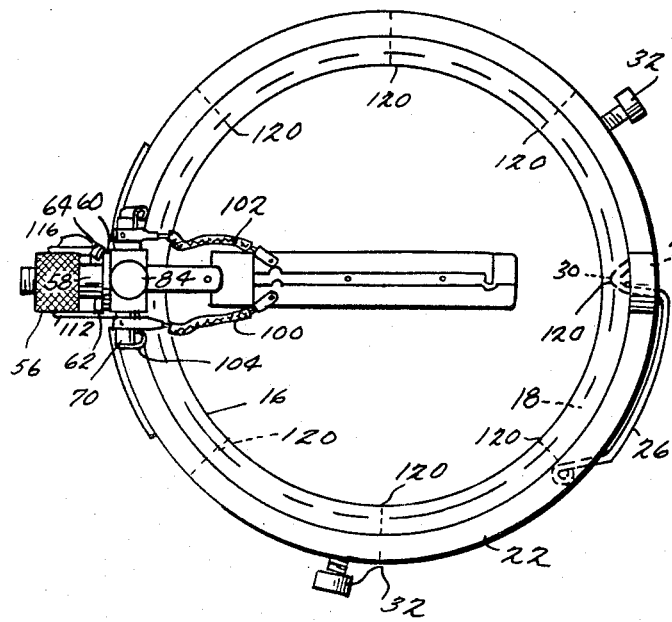
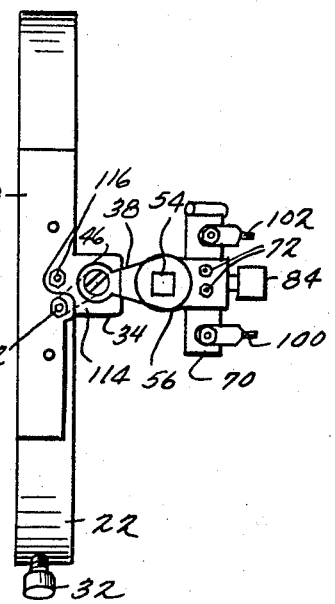
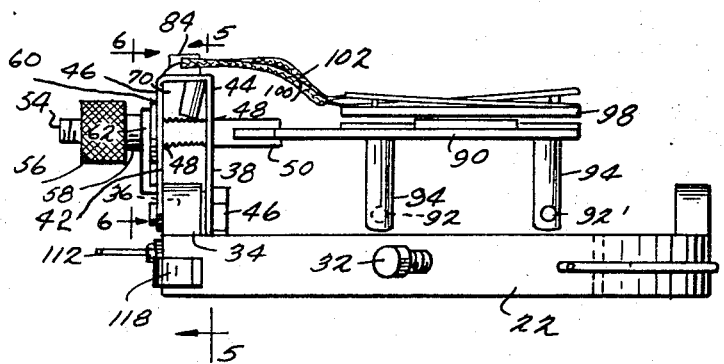
INVENTOR
FRANCIS H. McCLERNON
BY Cushman, Darby & Cushman
ATTORNEYS Dec. 17, 1968 F. H. McCLERNON 3,416,855
DEVICE FOR MEASURING THE CORNEA
Filed Aug. 17, 1964 3 Sheets-Sheet 3
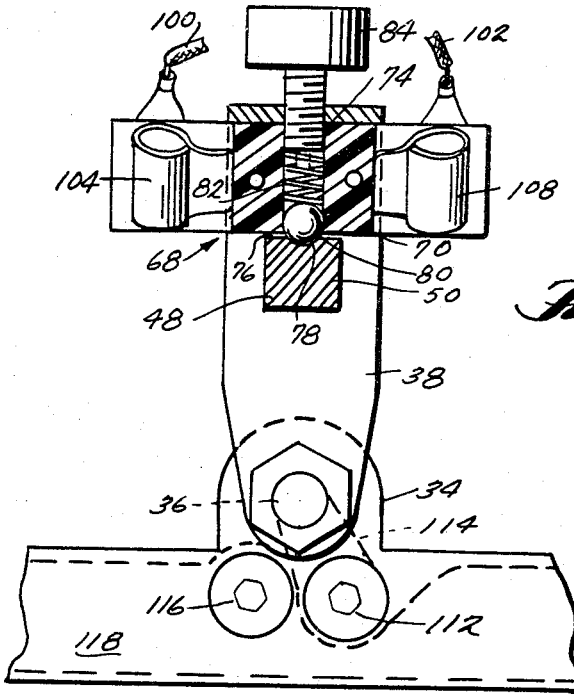
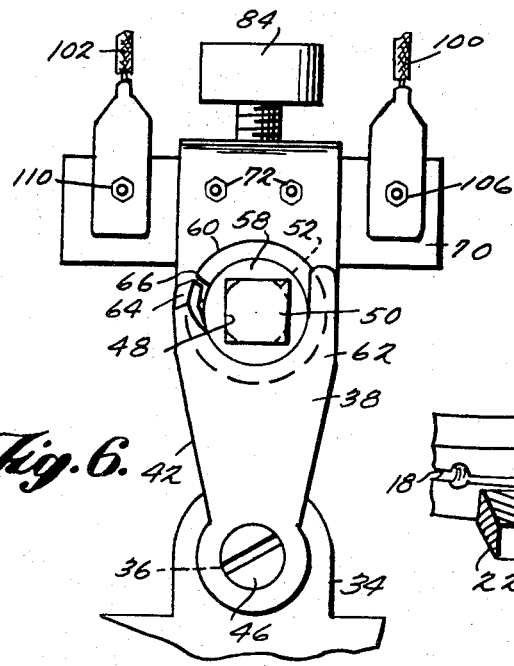
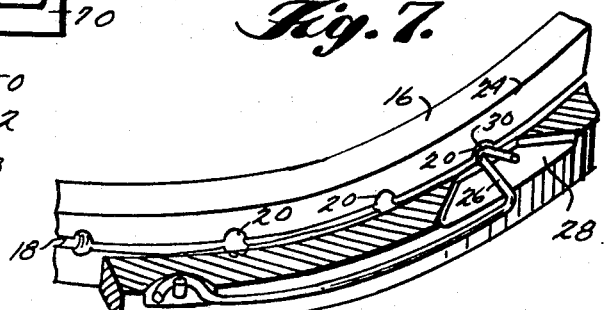
INVENTOR
FRANCIS H. McCLERNON
BY Cushman, Darby & Cushman
ATTORNEYS

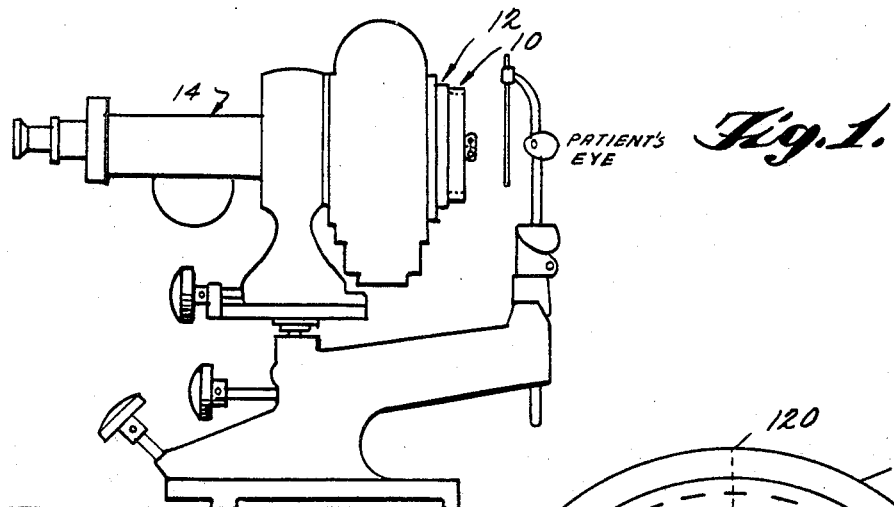
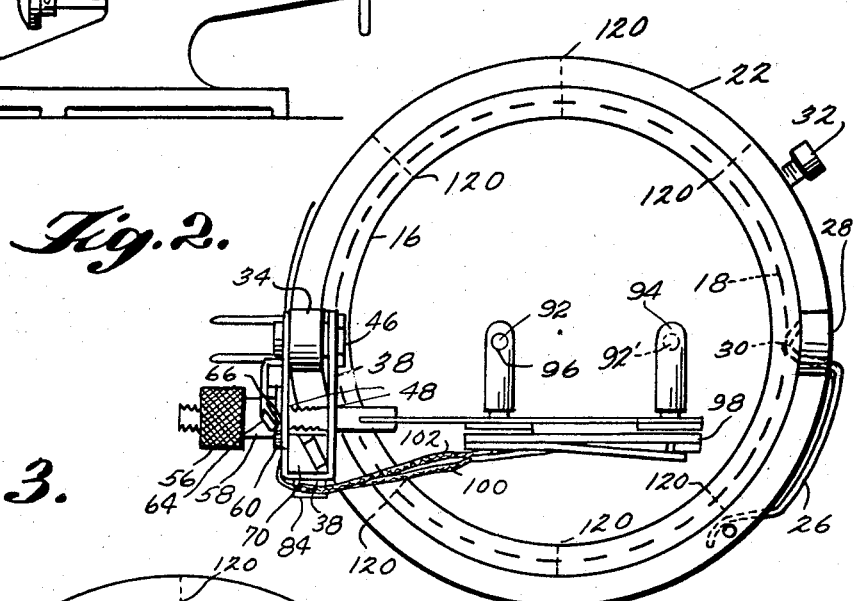
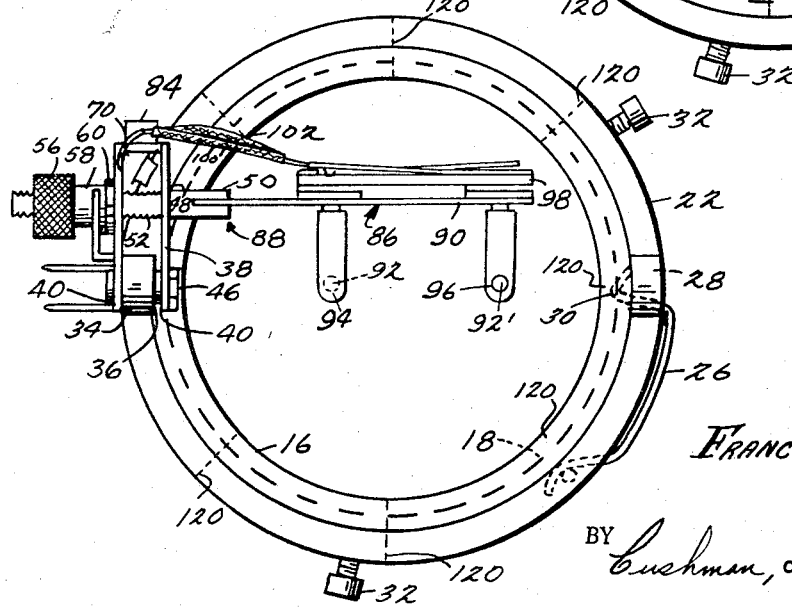

United States Patent Office 3,416,855
Patented Dec. 17, 1968

3,416,855
DEVICE FOR MEASURING THE CORNEA
Francis H. McClernon, 407 St. Louis St.,
Springfield, Mo. 65805
Filed Aug. 17, 1964, Ser. No. 389,898
4 Claims. (Cl. 351—6)

ABSTRACT OF THE DISCLOSURE

For mounting on the front of an ophthalometer, a pin point light source on a ring having provision for angular movement of the ring about its longitudinal axis and for movement of the light source radially on the ring.

---

The present invention relates to apparatus for the accurate measurement of corneal topography to facilitate the designing and fitting of corneal contact lenses.

Inasmuch as the exterior surface of the average cornea is not of constant curvature from the apex to the limbus, it is necessary to measure the surface topography of corneas and use the knowledge of curvature variation thus obtained to design well fitting contact lenses. Most generally corneas, absent astigmatism, are substantially spherically curved within an area of from about 5 to 8 millimeters extending radially from their apices, varying somewhat with individual eyes, but as a corneal surface approaches its limbus it becomes generally elliptically curved.

Traditionally corneas have been measured for eye glasses using ophthalometers, such as a Bausch and Lomb keratometer, which consist essentially of a target which is imaged by the cornea and a telescope to observe the image. Focusing on the image with the telescope provides a precise measurement relating to the curvature of the cornea exterior surface, in diopters, at the point being imaged. Such instruments are usually designed to provide a measurement of the zone, approximately 2.5 millimeters in diameter surrounding the center of the cornea, which is known as the visual apex.

However, the remainder of the surface of the cornea is not as accurately measurable as is necessary for fitting contact lenses utilizing such optical instruments absent the aid of some additional fixation device upon which the patient is requested to concentrate while the peripheral region of the patient's cornea is being measured. When contact lenses are to be prepared for the patient, it is important that this peripheral region be measured accurately because the curvature of the peripheral region of each contact lens must vary proportionately as the corresponding corneal surface in order to prevent irritation of the cornea as the lens "floats" or moves over the apical and peripheral areas and intermediate area of the cornea during use.

Accordingly, several fixation-type devices have been developed and utilized to aid in the measurement of the elliptical regions of corneal surfaces but they have not met with complete success because of inaccuracies produced by the difficulty the patient experiences in focusing on one of a plurality of movable visible fixation points placed three to four inches from the patient's eye as in the so-called "Jessop's Disc" and "Keratoscopic Disc of Gullstrang" (see Duke Elder Ophthalmology, volume 1, C. V. Mosby Co.). A similar development involving the utilization of fluorescent dots placed at equal radial distances from the central axis of the ophthalometer and a black light held behind the patient to illuminate the dots in an otherwise darkened room has also been employed, but this system has similarly failed to achieve complete success.

To a great extent, the shortcomings of these prior art systems are summarized by the observation that the reliability of the measurements made utilizing these systems depend to a substantial degree upon the amount of refractive error of the eye being measured, the skill of the refractionist and the objectivity of the patient, particularly relating to the extent to which the patient can be relied upon to fixate upon the correct spot.

Accordingly, it is a primary object of the present invention to provide apparatus for the measurement of corneas which utilizes radially and angularly movable, alternately usable, pin-point light sources, which being incident rather than reflective with respect to the patient's eye obviate the necessity of having to be completely in focus before the target can be recognized.

Another object of this invention is to provide apparatus of the type described wherein a single pin-point light source of light is presented to the patient for fixation, the light being accurately radially and angularly movable to facilitate measurements on the nasal, temporal, superior and inferior slopes of the cornea with a minimum of manipulation.

A further object of the present invention is the provision of apparatus of the type described which can be conveniently mounted on the forward end of a ophthalometer body and will not overly illuminate the refracting room or interfere with refraction measurements.

Yet another object of the invention is the provision, in appaartus of the type described, of means for precisely orienting a fixation point upon which an average patient can be taught to fixate reliably and without a considerable amount of practice and explanation being required.

These and further objects and advantages of the present invention will become more apparent and fully explained in the following detailed description of a preferred embodiment of the apparatus of the invention, reference being made to the attached drawings wherein the preferred embodiment is illustrated.

In the drawings:
FIGURE 1 is a side elevation view of an ophthalometer having a fixation device according to the invention carried on the forward end of the body therof;
FIGURE 2 is a front elevation view of the fixation device with the pin-point light source carrier in a first position thereof;
FIGURE 3 is a front elevtaion view of the fixation device with the pin-point light source carrier in a second position thereof;
FIGURE 4 is a side elevation view of the fixation device with the pin-point light source in a raised position intermediate the first and second positions of FIGURES 2 and 3;
FIGURE 5 is a sectional view taken along line 5—5 of FIGURE 9;
FIGURE 6 is a sectional view taken along line 6—6 of FIGURE 9;
FIGURE 7 is a fragmentary perspective view of the mounting rings of the device with portions broken away to expose the means for controlling angular movement of the fixation device with respect to the ophthalometer;
FIGURE 8 is a front elevation view of the fixation device similar to FIGURES 2 and 3 with the pin-point light source in the raised, non-operating position thereof and FIGURE 9 is a side elevation view of the fixation device with the pin-point light source carrier in the position as shown in FIGURE 8.

In FIGURE 1 the fixation device 10 is shown mounted for use on the generally cylindrical body 12 of the ophthalometer 14 just forwardly of the condensing lens and target of the ophthalometer.

The ophthalometer has been adapted for receiving the device 10 by the mounting of an annular ring 16 thereon (FIGURE 7) having a circumferentially extending radially outwardly facing groove 18 which includes a plurality of evenly spaced detents 20 therein for facilitating the accurate angular positioning of the device 10 with respect to the ophthalometer 14.

The fixation device 10 includes an annular ring 22 having a radially inner surface adapted to slidingly engage the radially outer surface 24 of the ring 16. Spring means 26 mounted on the ring 22 projects through an angularly extending slot 28 in the ring and has a foot 30 thereon which rides in the groove 18 for selective seating in angularly space detents 20.

The detents 20 are preferably spaced at 15 degree intervals through at least 180 degrees along the groove 18. Accordingly the fixation device can be rotated with respect to the ophthalometer in 15 degree increments for measuring a corneal surface, as more fully explained hereinafter, by grasping the ring 22 and rotating it with respect to the ring 16 until the foot 30 seats in the next detent 20.

A plurality of radially projecting set screws 32 may be provided on the ring 22 for selective engagement with the ring 16 to prevent inadvertent relative rotation of the rings 16, 22.

The ring 22 includes an axially projecting ear 34 having a radially directed opening 36 therethrough. A U-shaped yoke 38 is positioned over the ear 34 so that openings 40 formed near the lower ends of the legs 42, 44 are aligned with the opening 36 and securing means such as a nut and bolt arrangement 46 secure the yoke to the ear allowing pivotal movement of the yoke 38 between the positions shown in FIGURES 2 and 3.

Intermediate the ends of the legs 42, 44 a non-circular opening 48 is formed therethrough for reciving a non-circular shaft 50. The shaft 50, shown as a square shaft extends parallel to the transverse axis of the ring 22 which bisects the ear 34 and is selectively advanceable and retractable along its own longitudinal axis.

Threads 52 are formed on the shaft 50 extending from its outer end 54 and a knurled nut 56 is received thereon for advancing and retracting the shaft. The nut 56 includes an axially inner extension 58 which terminates in a radially enlarged annular collar 60 adapted to engage the outer surface of the yoke leg 42 peripherally of the square opening 48. A Y-shaped yoke 62 secured to the leg 42 is arranged to support the nut 56 against axial movement. Additionally, the outer end of one leg 64 of the yoke 62 is bent toward the nut collar 60 and arranged to resiliently seat in a notch 66 formed in the collar thus providing detent means to facilitate the selective advancement and retraction of the shaft 50 by increments of one revolution of the nut 56.

An alternately usable means for facilitating the controlled movement of the shaft 50 is provided by the detent means 68. This alternate means includes a transversely extending bar 70 of electrical insulating material mounted at the base of the inverted U-shaped yoke 38 between the legs 42, 44 as by nut and bolt assemblies 72.

The bar 70 has a bore 74 therein directed toward the surface 76 of the shaft 50 and the surface 76 includes a plurality of evenly longitudinally spaced generally hemispherical depressions 78. A ball 80 is received in the bore 74 and is resiliently biased into selective engagement with a depression 78 by a coil spring 82 received in the bore 74 between the ball 80 and a threadably received control screw 84.

To utilize the alternate detent means 68, the nut 56 is removed, whereupon the shaft 50 may be pushed and pulled causing the ball 80 to seat in selected depressions 78. Using this alternate means, larger increments of advancement and retraction of the shaft 50 can be provided and the amount of manipulation of the device needed to effect such advancement is substantially reduced.

The shaft 50 carries an axially outer extension 86 which with the shaft 50, yoke 38 and detent means constitutes a pin-point light source carrying arm 88.

The extension 86 includes a plate 90 upon which two spaced lights 92, 92′ are mounted so as to have one electrical contact of each light communicated to the plate 90. Each light 92, 92′ has a jacket 94 reeived thereover which includes a relatively small opening 96 therethrough so that light emitted from either light source will be substantially pin-pointed. The openings 96 are essentially located on a diametric plane of the ring 22 so that whether the arm is in the position of FIGURE 2 or the position of FIGURE 3 the light source in use will be movable radially of the ring 22. As shown one of the openings 96 is directed toward the subject's eye when the arm is in the position of FIGURE 2 and the other of the light sources is presented toward the subject's eye when the arm is in the position of FIGURE 3.

The electrical circuitry for the device 10 as illustrated in the drawings also includes an electrical insulator 98 mounted on the plate 90, and separate leads 100, 102 connected to the other electrical contact of each light 92 and secured to the insulator 98. The lead 100 extends to one end of the yoke mounted bar 70 where it is connected to a ring-facing leaf spring-like contact 104 as by a nut and bolt assembly 106. The lead 102 extends to the other end of the yoke mounted bar 70 where it is connected to a second ring-facing leaf spring-like contact 108 as by a nut and bolt assembly 110.

A first electrical socket received pin 112 is mounted on the ring 22 to project radially therefrom and is connected via a collar 114 received thereon to the yoke 38. A second pin 116, similar to pin 112 is mounted on the ring 22 adjacently parallel to pin 112 and is connected to a plate 118 which extends angularly on the radially outer surface of the ring 22.

The pins 112, 116 are communicable to a source of electrical energy preferably through conventional voltage varying means to control the brightness of the alternately lit lights 92, 92′.

It can now be seen that when the pins 112, 116 are connected to a voltage source, a circuit is established through the yoke 38, bar 70, plate 90, light 92, lead 100, contact 104 and plate 118 whereas the circuit through the light 92′ is interrupted because the contact 108 is separated from the plate 118. In FIGURE 3 the device is shown oriented for the lighting of the light source 92′ and the interruption of the circuit including the light source 92.

The lights 92, 92′ of the device 10 provide alternately usable fixation points which the patient can see and sufficiently hold in focus in a dark or semi-dark room in which the patient is conventionally positioned about 3.5 to 4 inches forwardly of the ophthalometer.

The human eye is approximately 25 millimeters in diameter and rotates on its axes as it focuses on the pin-point light source being utilized. The light sources 92, 92′ are easily positionable over the entire area to which the patient's eye must be directed in order to be able to measure the curvature and change in curvature of the entire exterior corneal surface of each eye. The radial positioning of the light source is accomplished by the yolk and detent arrangement and the angular positioning of the light source is provided by the selective angular movability of the ring 22 with respect to the opthalometer body.

The alternate lighting of the light sources as the source carrying arm is brought from its FIGURE 2 position to its FIGURE 3 position novelly facilitates the measurement of nasal and temporal or superior and inferior curvature measurements without having to advance or retract the source carrying arm the entire width of the ring 22. Because only a single pinpoint light source is presented to the patient at any time, the patient can not become confused or misunderstand the refractionist's instructions as to the point he should fixate upon.

Suitable indicia 120 are preferably placed on the device so that the determination of the positioning of the pinpoint light source with respect to the patient's cornea being mapped can easily be made at all times by the refractionist.

In gathering data for plotting the topography of a patient's corneal surfaces, one of the light sources is placed at a known distance from the center of the optical instrument which has been conventionally utilized to locate the center of the cornea.

The patient is then instructed to focus upon the pinpoint light source and, for instance, by having the patient focus upon the light positioned at the temporal side of the instrument, a measurement of the curvature of the cornea at the point thereof on the cornea's nasal side which is thus presented toward the ophthalometer can be made using the ophthalometer and the location information derived from the scales 120 regarding the coordinates of the exact point on the corneal surface where the measurement is being taken.

Where an eye having no special condition such as astigmatism or kerataconus (wherein the cornea approaches being conical in shape and is thus more radially sloped) a suitably complete mapping of the corneal typography may be made by taking, for instance, three measurements along radii the nasal and temporal curves of the cornea, flipping the arm from its FIGURE 2 to its FIGURE 3 position or vice versa at each axial positioning of the arm in order to minimize the required manipulation of the instrument, thereafter rotating the ring 22 90 degrees and similarly taking three measurements along the superior and inferior curves of the cornea. From the series of measurements of the slopes of cornea can be plotted.

Where special conditions including astigmatism or kerataconus are encountered, the device according to the present invention is especially useful inasmuch as more closely spaced easily accurately located measurements may be made by rotating the ring 22 in smaller increments utilizing the foot 30 riding in the groove 18 to seat in the detents 20. Additionally a greater number of more closely radially spaced measurements may be made along any radius utilizing single turns of the adjusting nut 56 between each measurement.

An additional advantage provided by the device 10 is that because the principal adjustments of the positioning of the light source being used are angularly and radially with respect to a longitudinal axis through the center of the cornea being measured, the plotting of the corneal topography may be directly plotted in polar or cylindrical coordinates thus facilitating the preparation of properly fitting corneal contact lenses.

It has been found that the ability of a patient to concentrate on the single accurately positioned pinpoint of light presented to him utilizing the apparatus of the invention is much greater than his ability to concentrate on an unlighted or light reflecting colored dot or on one of a plurality of dots such as are provided in the apparatus of the prior art discussed at the outset of this specification. This advantage is especially apparent where the accommodation of the eye whose cornea is being measured is beyond the location of the target used apparently because of the difference in difficulty experienced in focusing on incident as opposed to reflected lights.

It should now be apparent that the device described herein novelly accomplishes each of the objects of the invention set forth hereinabove. Inasmuch as the specific embodiment of the invention shown and described to facilitate the understanding of the principles of the invention can be modified somewhat without departing from these principles the present invention should be understood as encompassing all such modifications as are within the spirit and scope of the following claims.

I claim:

1. Apparatus for positioning between an ophthalmometer condensing lens and target, and a patient's eye to aid in precise measurement of the curvature of the cornea exterior surface, by providing at least one movable, accurately positionable, pin point light source for the patient's eye to focus upon while measurements are made using the ophthalmometer, said apparatus comprising: a ring; means for supporting the ring forwardly of an ophthalmometer condensing lens and target so as to be transversely aligned on the longitudinal axis of the ophthalmometer; a plurality of angularly spaced detent means on one of said ring and said supporting means and a detent follower on the other of said ring and said supporting means, said ring being rotatable about the longitudinal axis thereof and said detent means being alternately engageable by said detent follower to provide angularly spaced predetermined stops for angular orientation of said ring; an arm; an illuminable light source mounted on said arm; means mounting said arm on said ring in longitudinal alignment with the plane of said ring; adjustable securement means on said arm and said means mounting said arm permitting advancing and retracting of said arm along the longitudinal axis thereof; said light source being located in a diametric plane of said ring, whereby advancing and retracting of said arm moves said light source radially of the ring and ophthalmometer and angular movement of said ring positions said light source in line with angularly spaced radii of the ophthalmometer.

2. The apparatus of claim 1 further including a second illuminable light source mounted on said arm at a point thereon axially spaced from the first-mentioned light source; said light sources projecting laterally from said arm; mask means on said arm for each light source, constructed and arranged to expose said first light source for viewing only from one lateral side of the arm and to expose said second light source for viewing only from the opposite lateral side of the arm; the arm mounting means comprising a pivot joint on said ring having a pivot axis parallel to a diameter of said ring; yoke means mounted to said pivot joint for pivotal movement about said pivot axis; the arm being mounted on said yoke means near the outer end of the yoke means; said light sources being exposed by said mask means transversely to and at the level of said pivot axis, whereby movement of said arm, yoke means and light sources about said pivot axis alternately exposes said light sources for viewing by the patient's eye while maintaining said light sources on said pivot axis.

3. The apparatus of claim 2 including conductor means on said ring for establishing an electrical circuit through said ring to said light sources; a first contact on said yoke means electrically connected to the first of said light sources and arranged on said yoke means for contact with said ring conductor means only when the first light source is exposed, by rotation of said light sources, arm and yoke means for viewing by the patient's eye; a second contact on said yoke means electrically connected to the second of said light sources and arranged on said yoke means for contact with said ring conductor means only when the second light source is exposed, by rotation of said light sources, arm and yoke means for viewing by the patient's eye.

4. The apparatus of claim 2 including detent means on one of said arm and said yoke means and a detent follower on the other of said arm and yoke means arranged to alternatively engage for permitting advancement and retraction of the arm, along its own longitudinal axis, in predeterminable increments.

References Cited

UNITED STATES PATENTS

| | | | |
|---|---|---|---|
| 1,115,408 | 10/1914 | DeZeng | 351—23 |
| 1,187,763 | 6/1916 | Moevius | 351—36 |
| 1,887,115 | 8/1932 | Braun | 351—6 |
| 2,573,546 | 10/1951 | Costenbader et al. | 351—37 X |
| 3,108,523 | 10/1963 | Nuchman et al. | 351—40 X |

FOREIGN PATENTS

| | | |
|---|---|---|
| 1,311,019 | 10/1962 | France. |
| 1,192,716 | 4/1959 | France. |

DAVID SCHONBERG, *Primary Examiner.*

P. R. GILLIAM, *Assistant Examiner.*

U.S. Cl. X.R.

351—13